(12) United States Patent
Kim

(10) Patent No.: US 10,152,241 B2
(45) Date of Patent: Dec. 11, 2018

(54) DATA PROCESSING SYSTEM AND OPERATING METHOD THEREOF

(71) Applicant: SK hynix Inc., Gyeonggi-do (KR)

(72) Inventor: Do-Hyun Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 28 days.

(21) Appl. No.: 15/399,868

(22) Filed: Jan. 6, 2017

(65) Prior Publication Data

US 2017/0322738 A1    Nov. 9, 2017

(30) Foreign Application Priority Data

May 4, 2016   (KR) .................. 10-2016-0055126

(51) Int. Cl.
  *G06F 3/06*   (2006.01)
  *G06F 9/50*   (2006.01)
  *G06F 12/00*  (2006.01)

(52) U.S. Cl.
  CPC .......... *G06F 3/0611* (2013.01); *G06F 3/0659* (2013.01); *G06F 3/0679* (2013.01); *G06F 9/5083* (2013.01); *G06F 12/00* (2013.01)

(58) Field of Classification Search
  CPC ...... G06F 3/0611; G06F 3/064; G06F 3/0659; G06F 3/0679; G06F 3/0683; G06F 9/5083
  USPC ................. 710/6, 74; 711/154, 167, 169, 16
  See application file for complete search history.

(56) References Cited

U.S. PATENT DOCUMENTS

| | | | |
|---|---|---|---|
| 6,253,297 B1 * | 6/2001 | Chauvel ................. | G06F 13/28 711/154 |
| 6,434,664 B1 * | 8/2002 | Buch ..................... | G06F 3/0611 711/112 |
| 7,427,027 B2 | 9/2008 | Elhamias et al. | |
| 2012/0221767 A1 | 8/2012 | Post et al. | |
| 2014/0002465 A1 * | 1/2014 | Kwa ....................... | G06T 1/20 345/502 |
| 2016/0011966 A1 | 1/2016 | Keeler et al. | |

OTHER PUBLICATIONS

NN9010156, IBM Technical Disclosure Bulletin, Oct. 1990, "IOP Task Switching". (Year: 1990).*

* cited by examiner

*Primary Examiner* — Gary J Portka
(74) *Attorney, Agent, or Firm* — IP & T Group LLP

(57) ABSTRACT

A data processing system may include: a plurality of memory systems each comprising a memory device and a controller for the memory device; and a host system suitable for performing processes corresponding to workloads which are processed in the plurality of memory systems, wherein at a first time, the host system performs a first process corresponding to a first workload among the workloads and transmits a command corresponding to the first workload to the memory systems, and at a second time, the host system receives an acknowledgement signal of the command from the memory systems, checks an end time of a command operation corresponding to the command through the acknowledgement signal, and prepares the first process in advance according to the end time.

20 Claims, 11 Drawing Sheets

DATA PROCESSING SYSTEM AND OPERATING METHOD THEREOF

CROSS-REFERENCE TO RELATED APPLICATION

This U.S. non-provisional patent application claims priority under 35 U.S.C. § 119 to Korean Patent Application No. 10-2016-0055126, filed on May 4, 2016, in the Korean Intellectual Property Office (KIPO), the disclosure of which is incorporated herein by reference in its entirety.

TECHNICAL FIELD

Exemplary embodiments of the present invention relate to a data processing system which processes data between a host and a plurality of memory systems, and an operating method thereof.

DISCUSSION OF THE RELATED ART

The computer environment paradigm has shifted to ubiquitous computing systems that can be used anytime and anywhere. Due to this, use of portable electronic devices such as mobile phones, digital cameras, and notebook computers has rapidly increased. These portable electronic devices generally use a memory system employing memory devices for storing data. The memory system may be used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a data processing system capable of rapidly and stably processing data between a host and a plurality of memory systems and maximizing the use efficiency of the host and the plurality of memory systems, and an operating method thereof.

In an embodiment, a data processing system may include: a plurality of memory systems each comprising a memory device and a controller for the memory device; and a host system suitable for performing processes corresponding to workloads which are processed in the plurality of memory systems. At a first time, the host system may perform a first process corresponding to a first workload among the workloads and transmits a command corresponding to the first workload to the memory systems, and at a second time, the host system may receive an acknowledgement signal of the command from the memory systems, checks an end time of a command operation corresponding to the command through the acknowledgement signal, and prepares the first process in advance according to the end time.

The host system may end the first process which started at the first time in response to the first workload, according to the end time, and may perform a second process corresponding to a second workload among the workloads, at the second time.

The host system may receive data corresponding to the first workload from the memory systems which ended the command operation, at a third time, according to the end time.

The host system may end the second process which started at the second time and prepares the first process in advance, at a fourth time before the third time, according to the end time.

The host system may process the data corresponding to the first workload received from the memory systems by performing the first process prepared from the fourth time at the third time.

The host system may retain the prepared first process during a retention time from the third time, and may perform the prepared first process to process the data received from the memory systems during the retention time from the third time.

The retention time may be determined according to operation latency in the memory systems performing the command operation or transmission latency of the data corresponding to the first workload.

The memory systems may estimate the end time of the command operation which is performed in the memory systems in response to the command, and then may transmit the acknowledgement signal including time information corresponding to the end time to the host system.

The memory systems may estimate the end time in the memory systems which end processing the first workload, and may transmit the acknowledgement signal including timing information corresponding to the end time to the host system.

The time information corresponding to the end time may be included in a reserved region or an auxiliary region of the acknowledgement signal.

In an embodiment, an operating method of a data processing system, may include: transmitting a command corresponding to a first workload to a plurality of memory systems by performing a first process corresponding to the first workload among workloads which are performed by the plurality of memory systems each including a memory device and a controller for the memory device; receiving an acknowledgement signal of the command from the memory systems in response to the transmission of the command; and checking an end time of a command operation corresponding to the command through the acknowledgement signal, and then preparing the first process in advance according to the end time.

The operating method may further include ending the first process which started at a first time in response to the first workload, according to the end time, and performing a second process corresponding to a second workload among the workloads at a second time.

The operating method may further include receiving data corresponding to the first workload from the memory systems which ended the command operation, at a third time, according to the end time.

The preparing of the first process may include ending the second process which started at the second time, at a fourth time before the third time, according to the end time, and then preparing the first process in advance.

The operating method may further include processing the data corresponding to the first workload and received from the memory systems by performing the first process prepared from the fourth time at the third time.

The processing of the data may include: retaining the prepared first process during a retention time from the third time; and performing the prepared first process to process the data received from the memory system during the retention time from the third time.

The retention time may be determined according to operation latency in the memory systems performing the command operation or transmission latency of the data corresponding to the first workload.

The operating method may further include estimating the end time of the command operation which is performed in the memory systems in response to the command; and transmitting the acknowledgement signal including time information corresponding to the end time.

The operating method may further include estimating the end time in the memory systems which ends processing the first workload; and transmitting the acknowledgement signal including time information corresponding to the end time.

The time information corresponding to the end time is included in a reserved region or an auxiliary region of the acknowledgement signal.

In an embodiment, an operating method of a data processing system may include: transmitting a command corresponding to a workload from a host to a memory system; performing a command operation corresponding to the command by the memory system; transmitting an acknowledgement signal of the command from the memory system to the host, the acknowledgement signal includes an end time of the command operation; preparing a process corresponding to the workload in advance of the end time by the host; and after ending the command operation, performing the process corresponding to the workload by the host.

The preparing the process by the host may overlap with the performing the command operation by the memory system.

The memory system may include: a non-volatile memory device; and a controller connected to the non-volatile memory device and configured to estimate the end time of the command operation which is performed in the memory systems in response to the command.

BRIEF DESCRIPTION OF THE DRAWINGS

These and other features and advantages of the present invention of the present invention will be described in reference to the accompanying drawings, wherein.

DETAILED DESCRIPTION

Figure 1:
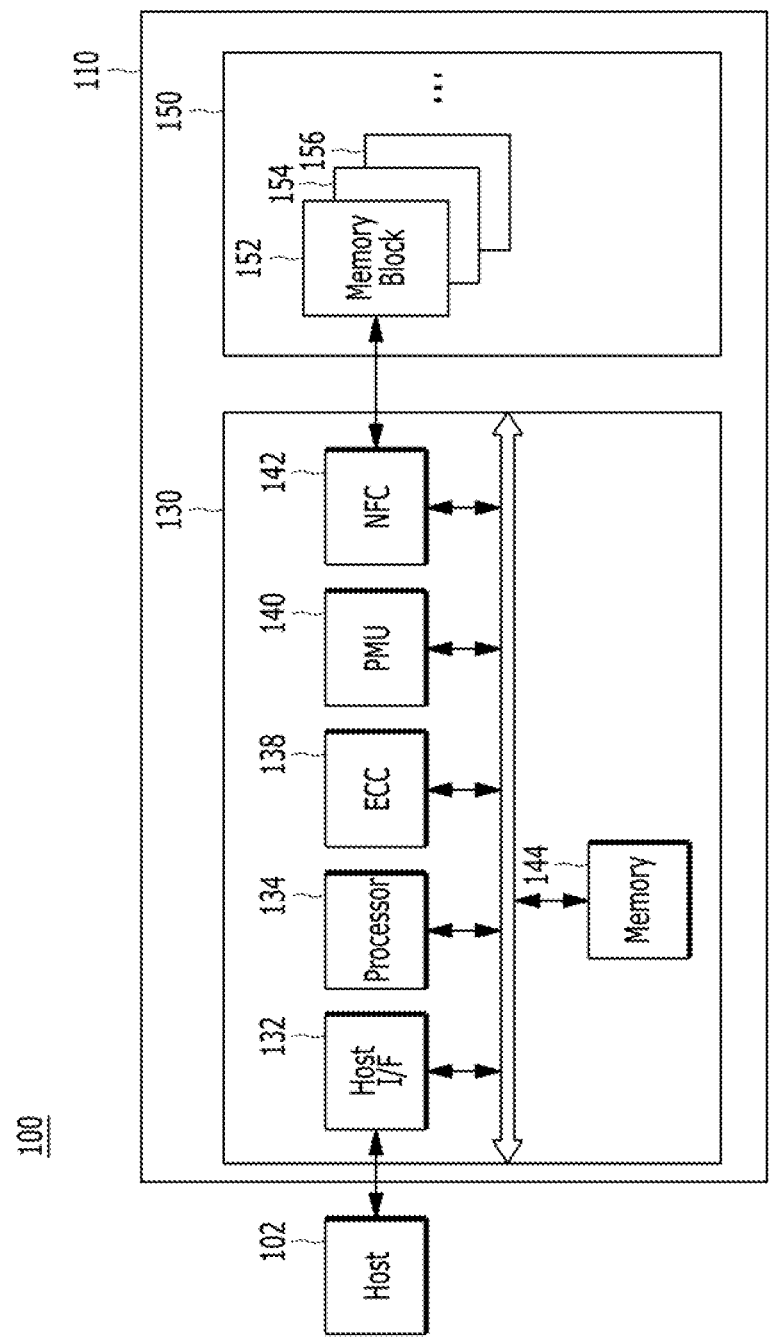
FIG. 1 is a diagram illustrating a data processing system including a memory system, according to an embodiment of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" Includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system, according to an embodiment of the present invention.

Referring to FIG. 1, the data processing system 100 may include a host 102 and a memory system 110.

The host 102 may include, for example, a portable electronic device such as a mobile phone, an MP3 player and a laptop computer or an electronic device such as a desktop computer, a game player, a television (TV) and a projector.

The memory system 110 may operate in response to a request from the host 102. For example, the memory system 110 may store data to be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices, such as, for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 and a controller 130. The memory device 150 stores data to be accessed by the host 102, and the controller 130 controls data exchange between the memory device 150 and the host 102. That is, under the control of the controller 130, data received from the host may be stored in the memory device 150.

The controller 130 and the memory device 150 may be integrated into one semiconductor device. For instance, the controller 130 and the memory device 150 may be integrated into one semiconductor device to form a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 may retain stored data even when power is blocked, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of a word line (WL) are electrically coupled. The memory cells may be single bit cells or multi-bit cells. The memory cells may be arranged in a two or three dimensional stacked structure. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 11.

The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control overall operations of the memory device 150, such as read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory such as a static random access memory (SRAM) or a dynamic random access memory (DRAM). As described above, the memory 144 may store data used by the host 102 and the memory device 150 for the read and write operations. For such storage of the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
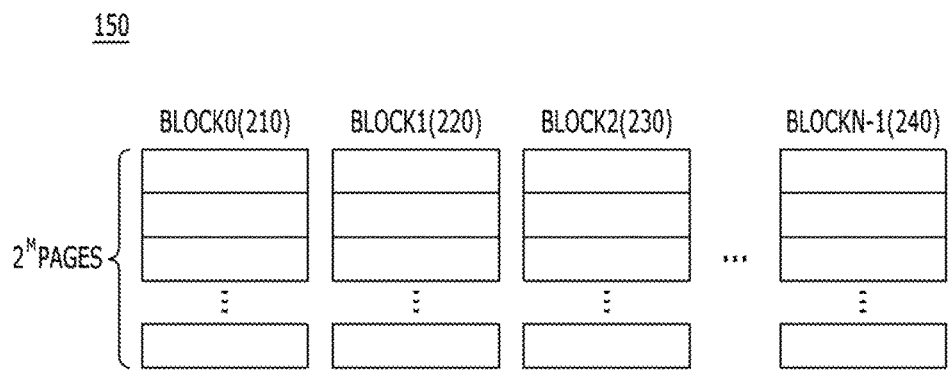
FIG. 2 is a diagram illustrating an example of a memory device employed in the memory system of FIG. 1.

FIG. 2 is a detailed diagram of the memory device 150 shown in FIG. 1.

Referring to FIG. 2, the memory device 150 may include a plurality of memory blocks, for example, a zeroth memory block (BLOCK0) 210, a first memory block (BLOCK1) 220, a second memory block (BLOCK2) 230 and an N-1$^{th}$ memory block (BLOCKN-1) 240. Each of the memory blocks 210 to 240 may include a plurality of pages, for example, $2^M$ number of pages ($2^M$ PAGES). Each of the pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the memory blocks 210 to 240 may store the data provided from the host 102 during a write operation, and provide the stored data to the host 102 during a read operation.

Figure 3:
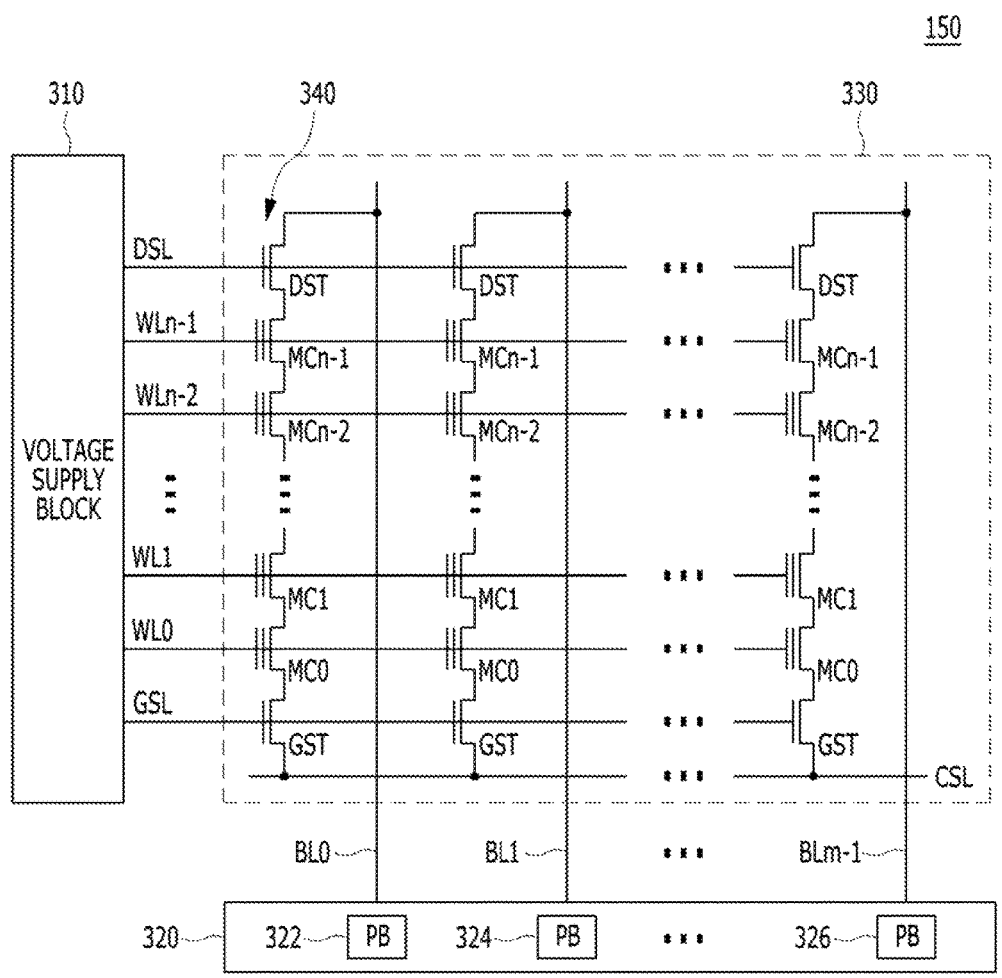
FIG. 3 is a circuit diagram illustrating a memory block in a memory device, according to an embodiment of the present invention.

FIG. 3 is a diagram illustrating a memory device 150 including the memory block shown in FIG. 2. FIG. 3 shows a detailed configuration of a single memory block 330 and circuits related thereto 310 and 320.

Referring to FIG. 3, the memory block 330 may include a plurality of cell strings 340 which are electrically coupled to bit lines BL0 to BLm-1, respectively. The cell string 340 of each column may include at least one drain select transistor (i.e., string select transistor) DST and at least one ground select transistor (i.e., source select transistor) GST. A plurality of memory cell transistors MC0 to MCn-1 may be electrically coupled in series between the select transistors GST and DST. The respective memory cells MC0 to MCn-1 may be configured by multi-level cells (MLC) each of which stores data information of a plurality of bits. The cell strings 340 may be electrically coupled to the corresponding bit lines BL0 to BLm-1, respectively. For reference, in FIG. 3, 'DSL' denotes a drain select line (i.e., a string select line), 'GSL' denotes a ground select line (i.e., a source select line), and 'CSL' denotes a common source line.

While FIG. 3 shows, as an example, the memory block 330 which is configured by NAND flash memory cells, it is to be noted that the memory block 330 of the memory device 300 according to an exemplary embodiment of the present invention is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 300 may provide word line voltages, for example, a program voltage, a read voltage and a pass voltage, to be supplied to respective word lines according to an operation mode and voltages to be supplied to bulks, for example, well regions, where the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 300 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

FIGS. 4 to 11 are schematic diagrams illustrating various aspects of the memory device 150 of FIG. 1.

Figure 4:
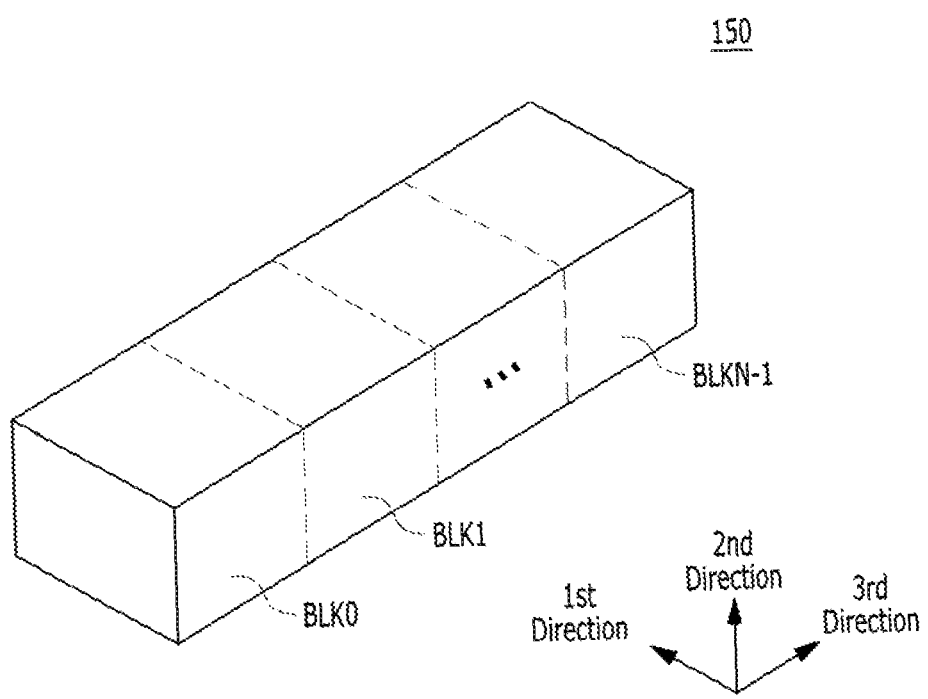
FIGS. 4 to 11 are diagrams schematically illustrating various aspects of the memory device of FIG. 1.

FIG. 4 is a block diagram illustrating an example of the plurality of memory blocks of the memory device 150.

Referring to FIG. 4, the memory device 150 may include a plurality of memory blocks BLK0 to BLKN-1, and each of the memory blocks BLK0 to BLKN-1 may be realized in a three-dimensional (3D) structure or a vertical structure. The respective memory blocks BLK0 to BLKN-1 may include structures which extend in first to third directions, for example, an x-axis direction, a y-axis direction and a z-axis direction.

The respective memory blocks BLK0 to BLKN-1 may include a plurality of NAND strings extending in the second direction. The plurality of NAND strings may be provided in the first direction and the third direction. Each NAND string may be electrically coupled to a bit line, at least one drain select line, at least one ground select line, a plurality of word lines, at least one dummy word line, and a common source line. Namely, the respective memory blocks BLK0 to BLKN-1 may be electrically coupled to a plurality of bit lines, a plurality of drain select lines, a plurality of ground select lines, a plurality of word lines, a plurality of dummy word lines, and a plurality of common source lines.

Figure 5:
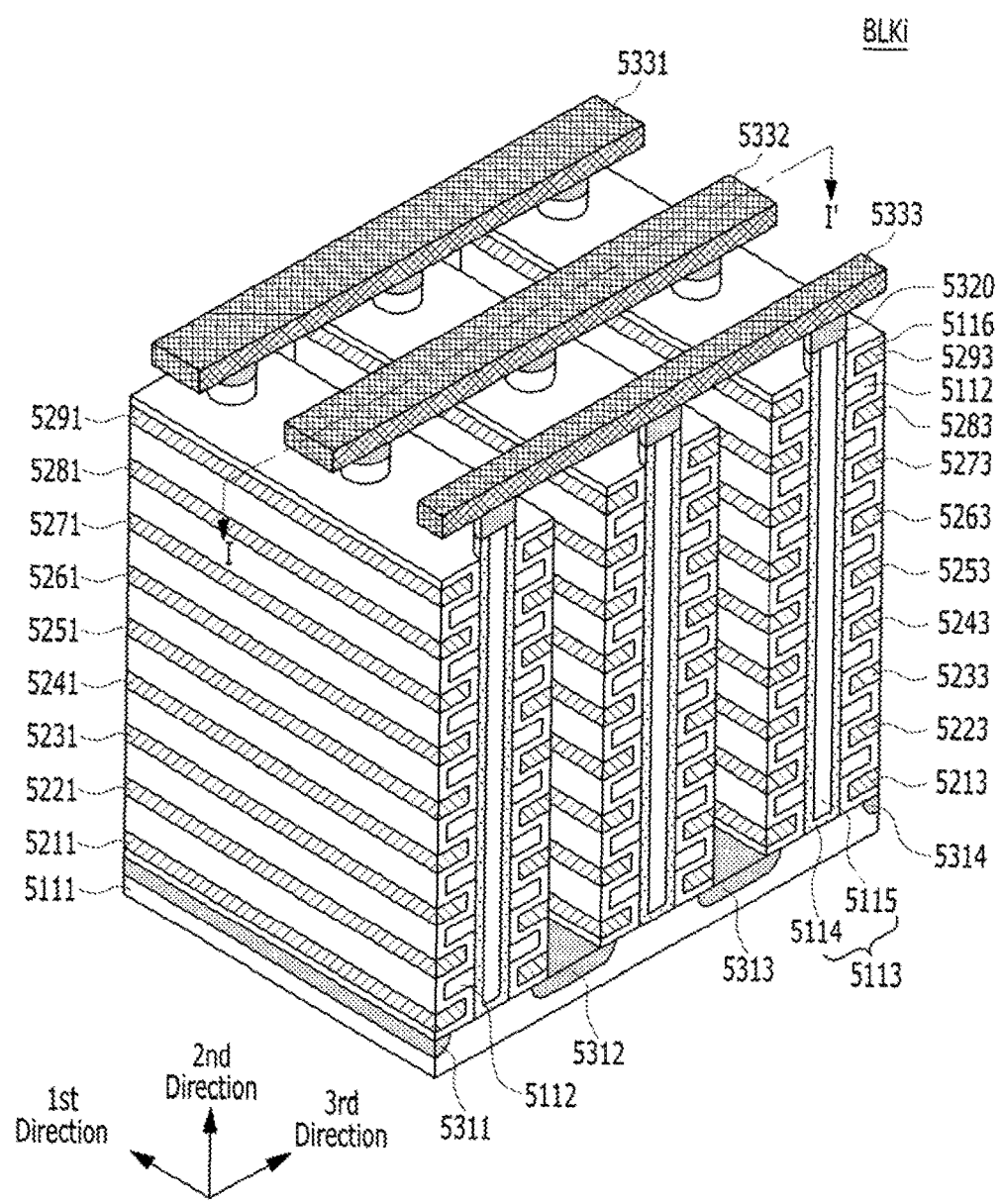
Figure 6:
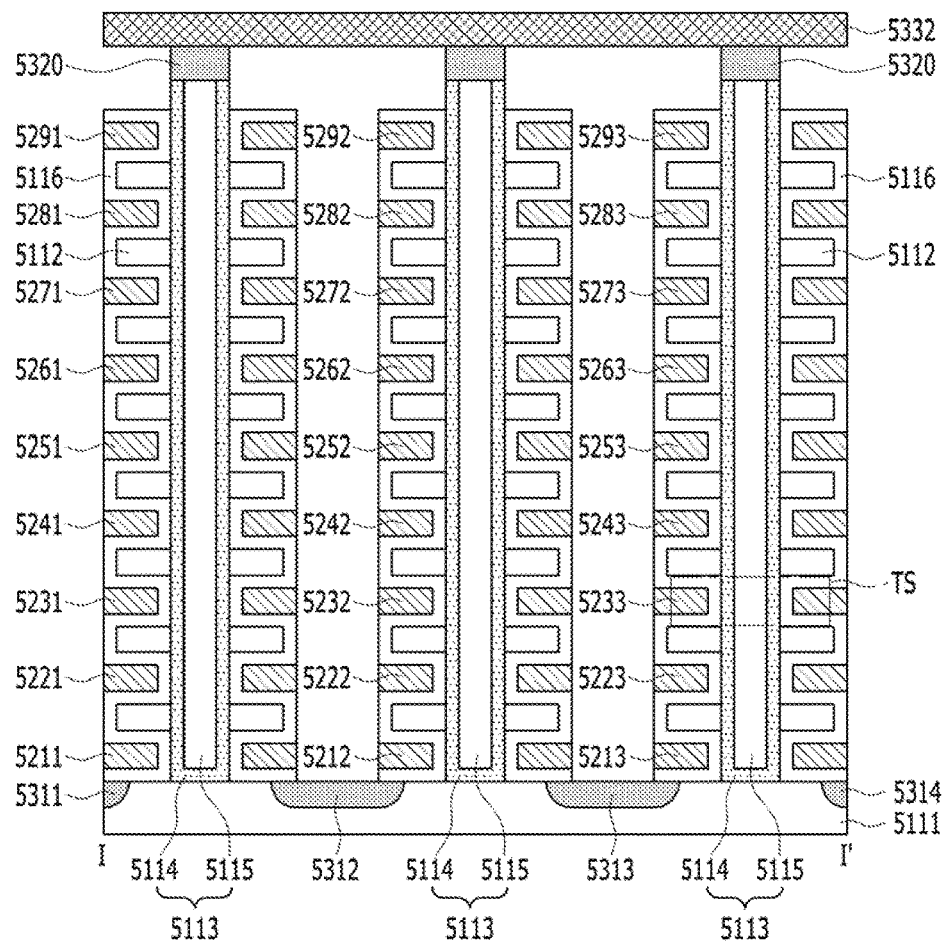

FIG. 5 is a perspective view of one BLKi of the plural memory blocks BLK0 to BLKN-1 of FIG. 4. FIG. 6 is a cross-sectional view taken along a line I-I' of the memory block BLKi of FIG. 5.

Referring to FIGS. 5 and 6, a memory block BLKi among the plurality of memory blocks of the memory device 150 may include a structure which extends in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. While it is assumed that the substrate 5111 is p-type silicon, it is to be noted that the substrate 5111 is not limited to being p-type silicon.

A plurality of doped regions 5311 to 5314 extending in the first direction may be provided on the substrate 5111. The plurality of doped regions 5311 to 5314 may contain impurities (i.e., second type impurities), different from the impurities contained in the substrate 5111 (i.e., first type impurities). The plurality of doped regions 5311 to 5314 may be doped with an n-type impurity. While it is assumed here that first to fourth doped regions 5311 to 5314 are n-type, it is to be noted that the first to fourth doped regions 5311 to 5314 are not limited to being n-type. In an exemplary embodiment, the plurality of doped regions 5311 to 5314 may be formed in the substrate 5111.

In the region over the substrate 5111 between the first and second doped regions 5311 and 5312, a plurality of dielectric materials 5112 extending in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide, silicon nitride, silicon oxy-nitride, or combinations thereof.

In the region over the substrate 5111 between the first and second doped regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. A surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon. In an exemplary embodiment, the surface layer 5114 may be in directly contact with the substrate 5111.

An inner layer 5115 of each pillar 5113 may be formed of a dielectric material. The inner layer 5115 of each pillar 5113 may be filled by a dielectric material such as silicon oxide.

In the region between the first and second doped regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. In other words, a region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doped regions 5311 and 5312, conductive materials 5211 to 5291 may be provided over the exposed surface of the dielectric layer 5116. The conductive material 5211 which extends in the first direction may be provided between the dielectric material 5112 adjacent to the substrate 5111 and the substrate 5111. In particular, the conductive material 5211 which extends in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material which extends in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 extending in the first direction may be provided between the dielectric materials 5112. The conductive material 5291 which extends in the first direction may be provided over the uppermost dielectric material 5112. The conductive materials 5211 to 5291 extending in the first direction may be a metallic material. The conductive materials 5211 to 5291 extending in the first direction may be a conductive material such as polysilicon, metal, metal-nitride, metal-oxide, metal-silicide, conductive carbon, or combinations thereof.

In the region between the second and third doped regions 5312 and 5313, the same structures as the structures between the first and second doped regions 5311 and 5312 may be provided. For example, in the region between the second and third doped regions 5312 and 5313, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 extending in the first direction may be provided.

In the region between the third and fourth doped regions 5313 and 5314, the same structures as between the first and second doped regions 5311 and 5312 may be provided. For example, in the region between the third and fourth doped regions 5313 and 5314, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 extending in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive materials 5331 to 5333 extending in the third direction may be provided over the drains 5320. The conductive materials 5331 to 5333 may be sequentially disposed in the first direction. The respective conductive materials 5331 to 5333 may be electrically coupled with the drains 5320 of corresponding regions. The drains 5320 and the conductive materials 5331 to 5333 extending in the third direction may be electrically coupled with through contact plugs. The conductive materials 5331 to 5333 extending in the third direction may be a metallic material. The conductive materials 5331 to 5333 extending in the third direction may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 extending in the first direction. The respective pillars 5113 may form NAND strings together with the dielectric layer 5116 and the conductive materials 5211 to 5291, 5212 to 5292 and 5213 to 5293 extending in the first direction. Each NAND string may include a plurality of transistor structures TS.

Figure 7:
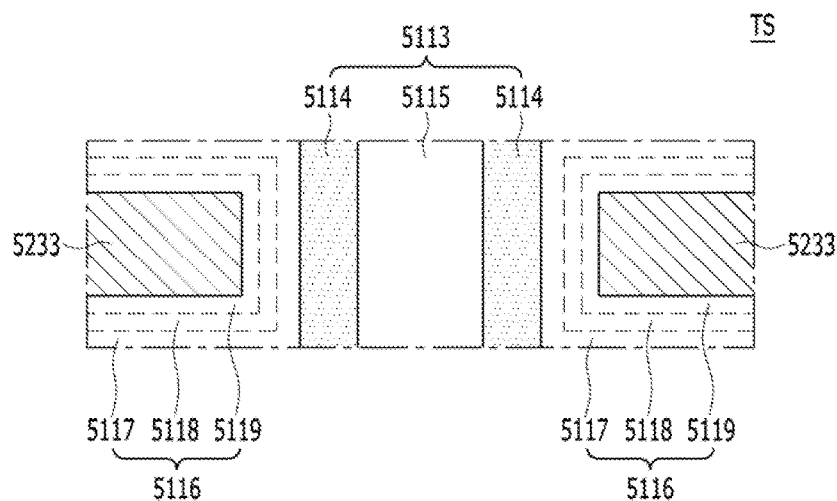

FIG. 7 is a detailed cross-sectional view of the transistor structure TS of FIG. 6.

Referring to FIG. 7, in the transistor structure TS of FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings. In detail, the memory block BLKi may include the plurality of NAND strings extending in the second direction or a direction perpendicular to the substrate 5111.

Each NAND string may include the plurality of transistor structures TS which are disposed in the second direction. At least one of the plurality of transistor structures TS of each NAND string may serve as a drain select transistor (i.e., a string select transistor). At least one of the plurality of transistor structures TS of each NAND string may serve as a ground select transistor (i.e., a source select transistor).

The gates or control gates may correspond to the conductive materials 5211 to 5291, 5212 to 5292 and 5213 to 5293 extending in the first direction. In other words, the gates or the control gates may extend in the first direction and form word lines and at least one drain select line and at least one ground select line.

The conductive materials 5331 to 5333 extending in the third direction may be electrically coupled to one end of the NAND strings.

The conductive materials 5331 to 5333 extending in the third direction may serve as bit lines. That is, in one memory block BLKi, the plurality of NAND strings may be electrically coupled to one bit line.

The second type doped regions 5311 to 5314 extending in the first direction may be provided to the other ends of the NAND strings. The second type doped regions 5311 to 5314 extending in the first direction may serve as common source lines.

Namely, the memory block BLKi may include a plurality of NAND strings extending in a direction perpendicular to the substrate 5111, e.g., the second direction, and may serve as a NAND flash memory block, for example, of a charge capturing type memory, in which a plurality of NAND strings are electrically coupled to one bit line.

While it is illustrated in FIGS. 5 to 7 that the conductive materials 5211 to 5291, 5212 to 5292 and 5213 to 5293 extending in the first direction are provided in 9 layers, it is to be noted that the conductive materials 5211 to 5291, 5212 to 5292 and 5213 to 5293 extending in the first direction are not limited to being provided in 9 layers. For example, conductive materials extending in the first direction may be provided in 8 layers, 16 layers or any multiple of layers. In other words, in one NAND string, the number of transistors may be 8, 16 or more.

While it is illustrated in FIGS. 5 to 7 that 3 NAND strings are electrically coupled to one bit line, it is to be noted that the embodiment is not limited to having 3 NAND strings that are electrically coupled to one bit line. In the memory block BLKi, m number of NAND strings may be electrically coupled to one bit line, where m is a positive integer. According to the number of NAND strings which are electrically coupled to one bit line, the number of conductive materials 5211 to 5291, 5212 to 5292 and 5213 to 5293 extending in the first direction and the number of common source lines 5311 to 5314 may be controlled as well.

Further, while it is illustrated in FIGS. 5 to 7 that 3 NAND strings are electrically coupled to one conductive material which extends in the first direction, it is to be noted that the embodiment is not limited to having 3 NAND strings electrically coupled to one conductive material which extends in the first direction. For example, n number of NAND strings may be electrically coupled to one conductive material which extends in the first direction, n being a positive integer. According to the number of NAND strings which are electrically coupled to one conductive material which extends in the first direction, the number of bit lines 5331 to 5333 may be controlled as well.

Figure 8:
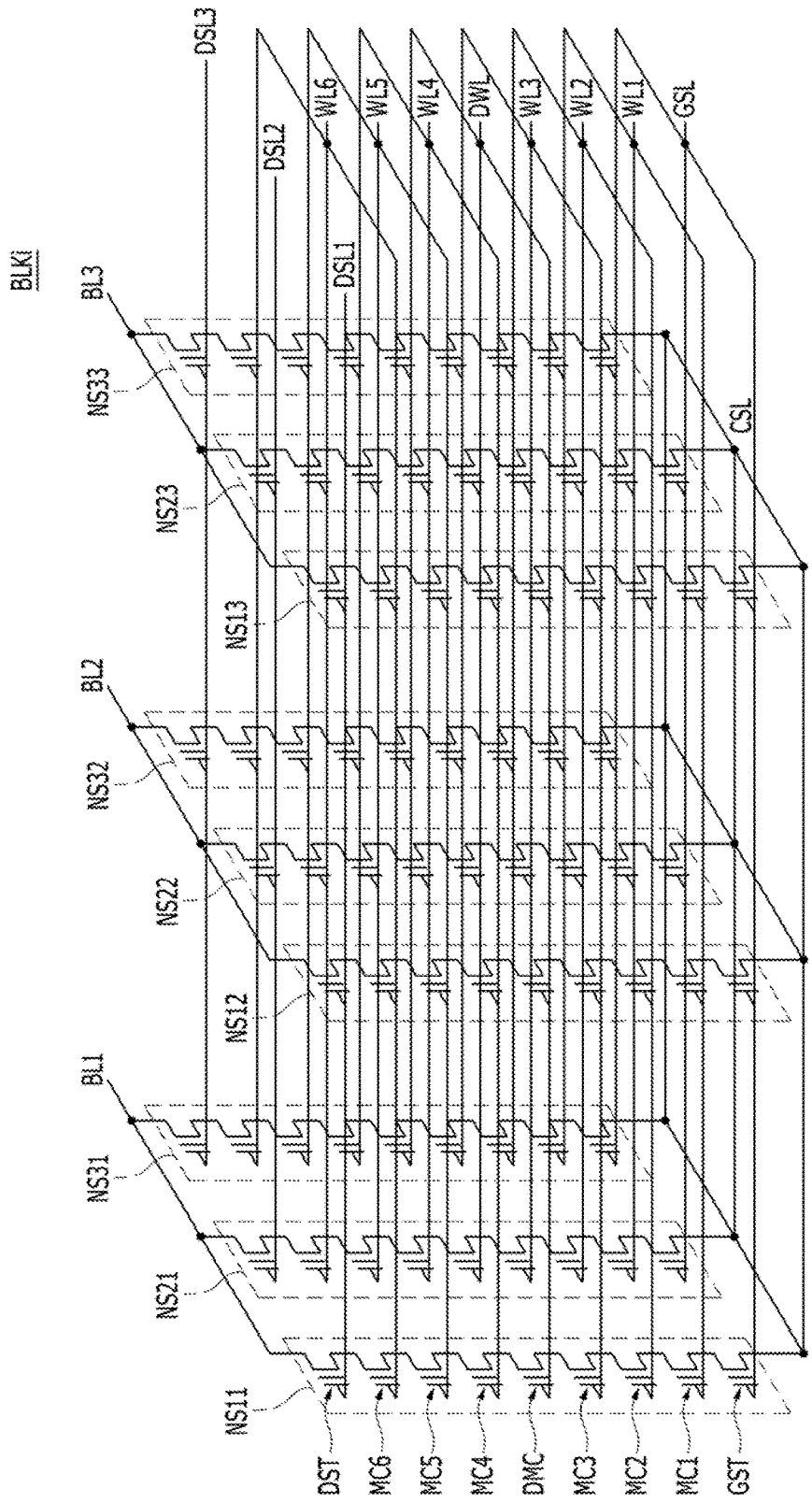

FIG. 8 is a circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A drain select transistor (i.e., a string select transistor) DST of each NAND string may be electrically coupled to a corresponding bit line. A ground select transistor (i.e., a source select transistor) GST of each NAND string may be electrically coupled to the common source line CSL. Memory cells MC1 to MC6 may be provided between the drain select transistor DST and the ground select transistor GST of each NAND string.

In this example, NAND strings may be defined by units of rows and columns and NAND strings which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings which are electrically coupled to one drain select line may form one row. The NAND strings NS11 to NS13 which are electrically coupled to a first drain select line DSL1 may form a first row, the NAND strings NS21 to NS23 which are electrically coupled to a second drain select line DSL2 may form a second row, and the NAND strings NS31 to NS33 which are electrically coupled to a third drain select line DSL3 may form a third row.

In each NAND string, a height may be defined. In each NAND string, the height of a memory cell MC1 adjacent to the ground select transistor GST may have a value '1'. In each NAND string, the height of a memory cell may increase as the memory cell gets closer to the drain select transistor DST when measured from the substrate 5111. In each NAND string, the height of a memory cell MC6 adjacent to the drain select transistor DST may be 7.

The drain select transistors DST of the NAND strings in the same row may share the drain select line DSL. The drain select transistors of the NAND strings in different rows may be respectively electrically coupled to the different drain select lines DSL1, DSL2 and DSL3.

The memory cells at the same height in the NAND strings in the same row may share a word line. That is, at the same height, the word lines electrically coupled to the memory cells of the NAND strings in different rows may be electrically coupled. Dummy memory cells DMC at the same height in the NAND strings of the same row may share a dummy word line DWL. Namely, at the same height or level, the dummy word lines DWL electrically coupled to the dummy memory cells DMC of the NAND strings in different rows may be electrically coupled.

The word lines or the dummy word lines DWL located at the same level or height or layer may be electrically coupled with one another at layers where the conductive materials 5211 to 5291, 5212 to 5292 and 5213 to 5293 extending in the first direction may be provided. The conductive materials 5211 to 5291, 5212 to 5292 and 5213 to 5293 extending in the first direction may be electrically coupled in common to upper layers through contacts. At the upper layers, the conductive materials 5211 to 5291, 5212 to 5292 and 5213 to 5293 extending in the first direction may be electrically coupled. In other words, the ground select transistors GST of the NAND strings in the same row may share the ground select line GSL. Further, the ground select transistors GST of the NAND strings in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings. Over the active regions and over the substrate 5111, the first to fourth doped regions 5311 to 5314 may be electrically coupled. The first to fourth doped regions 5311 to 5314 may be electrically coupled to an upper layer through contacts and, at the upper layer, the first to fourth doped regions 5311 to 5314 may be electrically coupled.

Namely, as of FIG. 8, the word lines of the same height or level may be electrically coupled. Accordingly, when a word line at a specific height is selected, all NAND strings which are electrically coupled to the word line may be selected. The NAND strings in different rows may be electrically coupled to different drain select lines. Accordingly, among the NAND strings electrically coupled to the same word line, by selecting one of the drain select lines DSL1 to DSL3, the NAND strings in the unselected rows may be electrically isolated from the bit lines BL1 to BL3. In other words, by selecting one of the drain select lines DSL1 to DSL3, a row of NAND strings may be selected.

Moreover, by selecting one of the bit lines BL1 to BL3, the NAND strings in the selected rows may be selected in units of columns.

In each NAND string, a dummy memory cell DMC may be provided. In FIG. 8, the dummy memory cell DMC may be provided between a third memory cell MC3 and a fourth memory cell MC4 in each NAND string. That is, first to third memory cells MC1 to MC3 may be provided between the dummy memory cell DMC and the ground select transistor GST. Fourth to sixth memory cells MC4 to MC6 may be provided between the dummy memory cell DMC and the drain select transistor DST. The memory cells of each NAND string may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the drain select transistor (i.e., string select transistor DST) may be referred to as an upper memory cell group.

Hereinbelow, detailed descriptions will be made with reference to FIGS. 9 to 11, which show the memory device in the memory system according to an embodiment implemented with a three-dimensional (3D) nonvolatile memory device different from the first structure.

Figure 9:
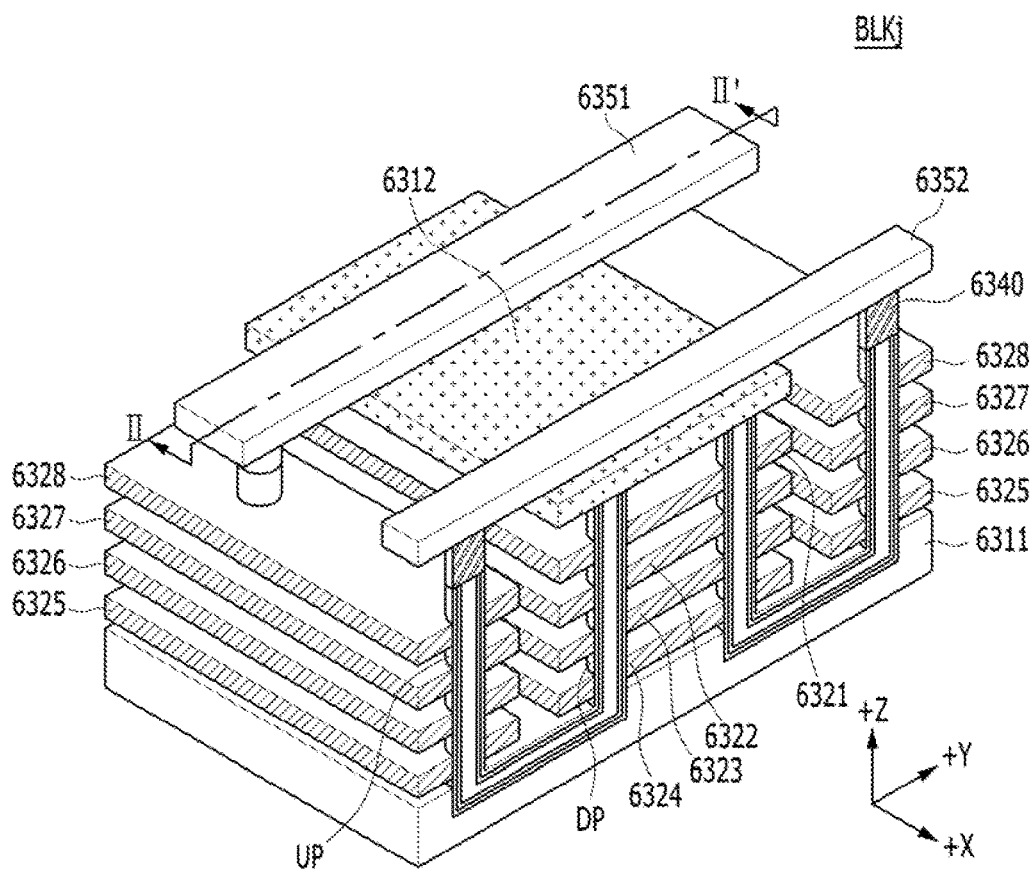

FIG. 9 is a perspective view schematically illustrating the memory device implemented with the three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line II-II' of FIG. 9.

Figure 10:
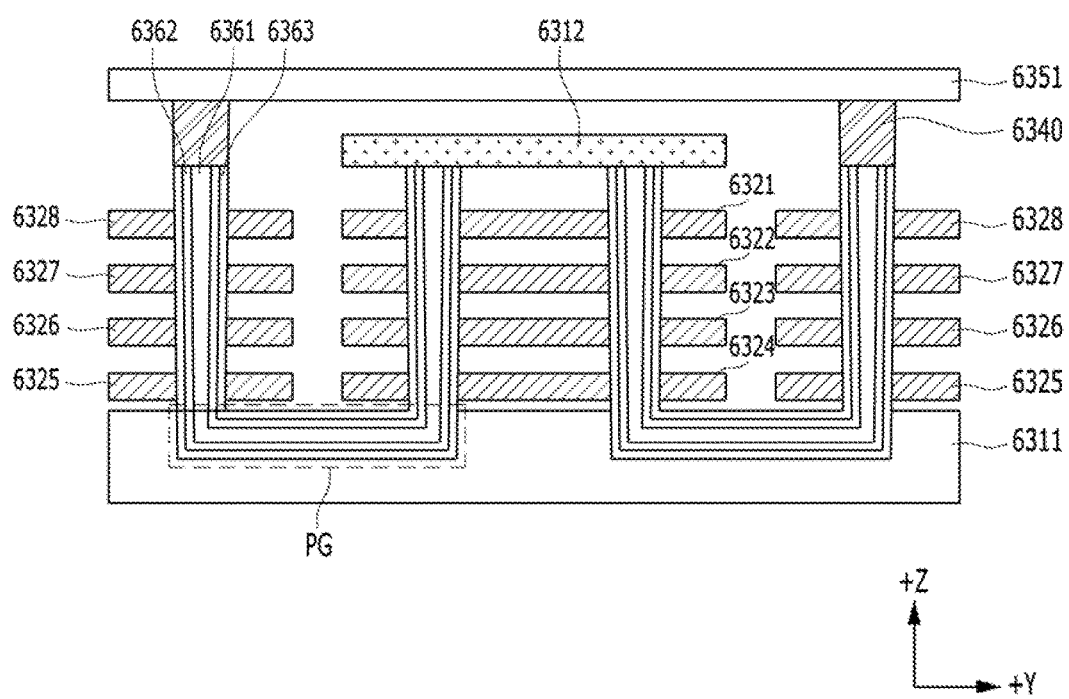

Referring to FIGS. 9 and 10, the memory block BLKj among the plurality of memory blocks of the memory device 150 of FIG. 1 may include structures extending in the first to third directions (i.e., x-axis, y-axis, and z-axis).

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment for the sake of convenience that the substrate 6311 is p-type silicon, it is to be noted that the substrate 6311 is not limited to being p-type silicon.

First to fourth conductive materials 6321 to 6324 extending in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 extending in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each lower pillar DP extends in the z-axis direction. Also, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doped material 6312 of a second type which extends in the x-axis direction and the y-axis direction may be provided over the lower pillars DP. For example, the doped material 6312 of the second type may include an n-type silicon material. The doped material 6312 of the second type may serve as a common source line CSL.

Drains 6340 may be provided over the upper pillars UP. The drains 6340 may include an n-type silicon material. First and second upper conductive materials 6351 and 6352 extending in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs.

The first and second upper conductive materials 6351 and 6352 respectively serve as first and second bit lines BL1 and BL2.

The first conductive material 6321 may serve as a ground select line (i.e., a source select line), the second conductive material 6322 may serve as a first dummy word line, and the third and fourth conductive materials 6323 and 6324 serve as first and second main word lines, respectively. The fifth and sixth conductive materials 6325 and 6326 serve as third and fourth main word lines, respectively, the seventh conductive material 6327 may serve as a second dummy word line, and the eighth conductive material 6328 may serve as a drain select line (i.e., a string select line).

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string may be electrically coupled through the pipe gate PG. One end of the lower string may be electrically coupled to the doped material 6312 of the second type which serves as the common source line. One end of the upper string may be electrically coupled to a corresponding bit line through the drain 6340. One lower string and one upper string form one cell string which is electrically coupled between the doped material 6312 of the second type serving as the common source line and a corresponding one of the upper conductive material layers 6351 and 6352 serving as the bit line.

That is, the lower string may include a source select transistor, the first dummy memory cell, and the first and second main memory cells. The upper string may include the third and fourth main memory cells, the second dummy memory cell, and a drain select transistor.

In FIGS. 9 and 10, the upper string and the lower string may form a NAND string, and the NAND string may include a plurality of transistor structures. Since the transistor structure included in the NAND string in FIGS. 9 and 10 is described above in detail with reference to FIG. 7, a detailed description thereof will be omitted herein.

Figure 11:
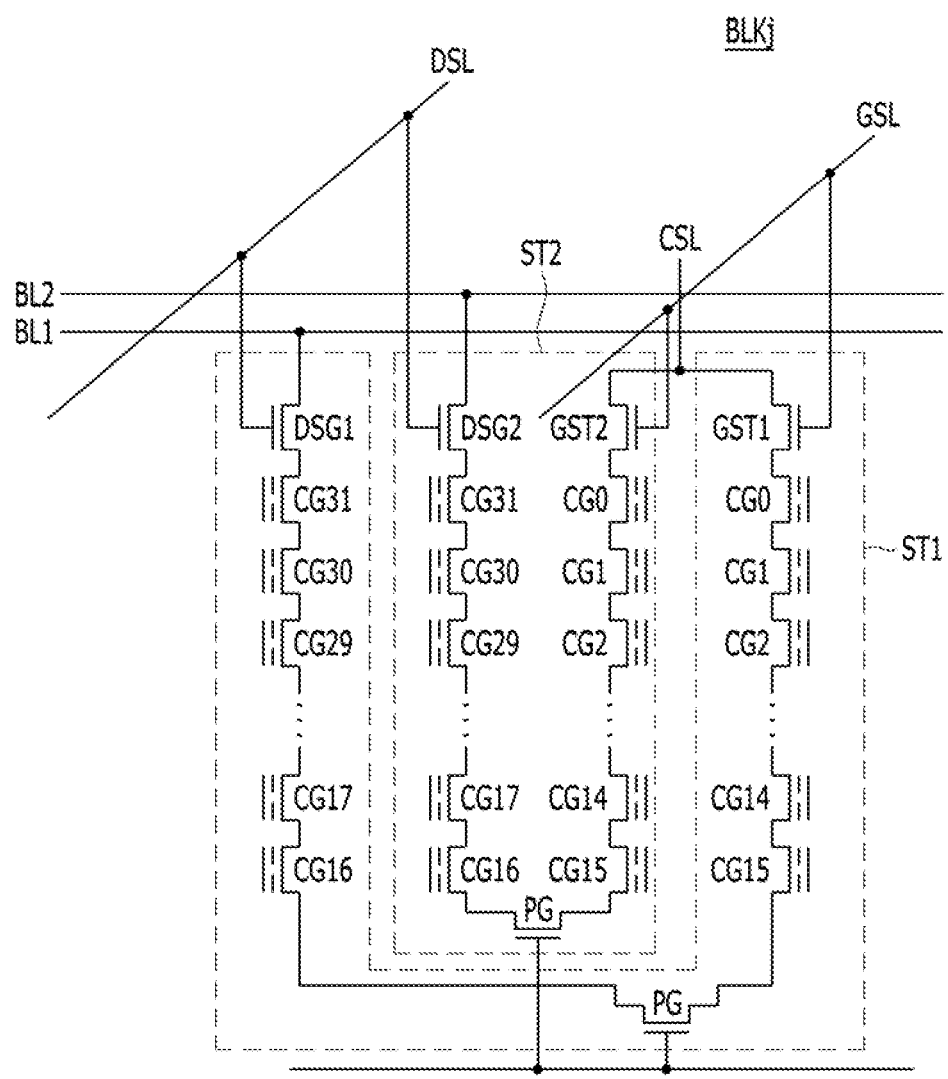

FIG. 11 is a circuit diagram illustrating of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel (not shown), for example, at least one ground select gate (i.e., source select gate) GSG1 and at least one drain select gate (i.e., string select gate) DSG1 may form a first string ST1, and memory cells CG0 to CG31 stacked along a second channel (not shown), for example, at least one ground select gate GSG2 and at least one drain select gate DSG2 may form a second string ST2.

The first string ST1 and the second string ST2 may be electrically coupled to the same drain select line DSL and the same ground select line GSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same ground select line GSL, it may be envisaged that the first string ST1 and the second string ST2 may be electrically coupled to the same ground select line GSL and the same bit line, the first string ST1 may be electrically coupled to a first drain select line and the second string ST2 may be electrically coupled to a second drain select line. Further it may be envisaged that the first string ST1 and the second string ST2 may be electrically coupled to the same drain select line DSL and the same bit line, the first string ST1 may be electrically coupled to a first ground select line and the second string ST2 may be electrically coupled a second ground select line.

Hereafter, referring to FIGS. 12 to 14, a data processing operation between a host and a plurality of memory systems which are included in a data processing system will be described in more detail, according to an embodiment of the present invention. During the data processing operation, the host 102 may transmit a command to the plurality of memory systems, the plurality of memory systems may perform a command operation in response to the command received from the host 102, and the host 102 may perform a process according to the command operation of the plurality of memory systems.

Figure 12:
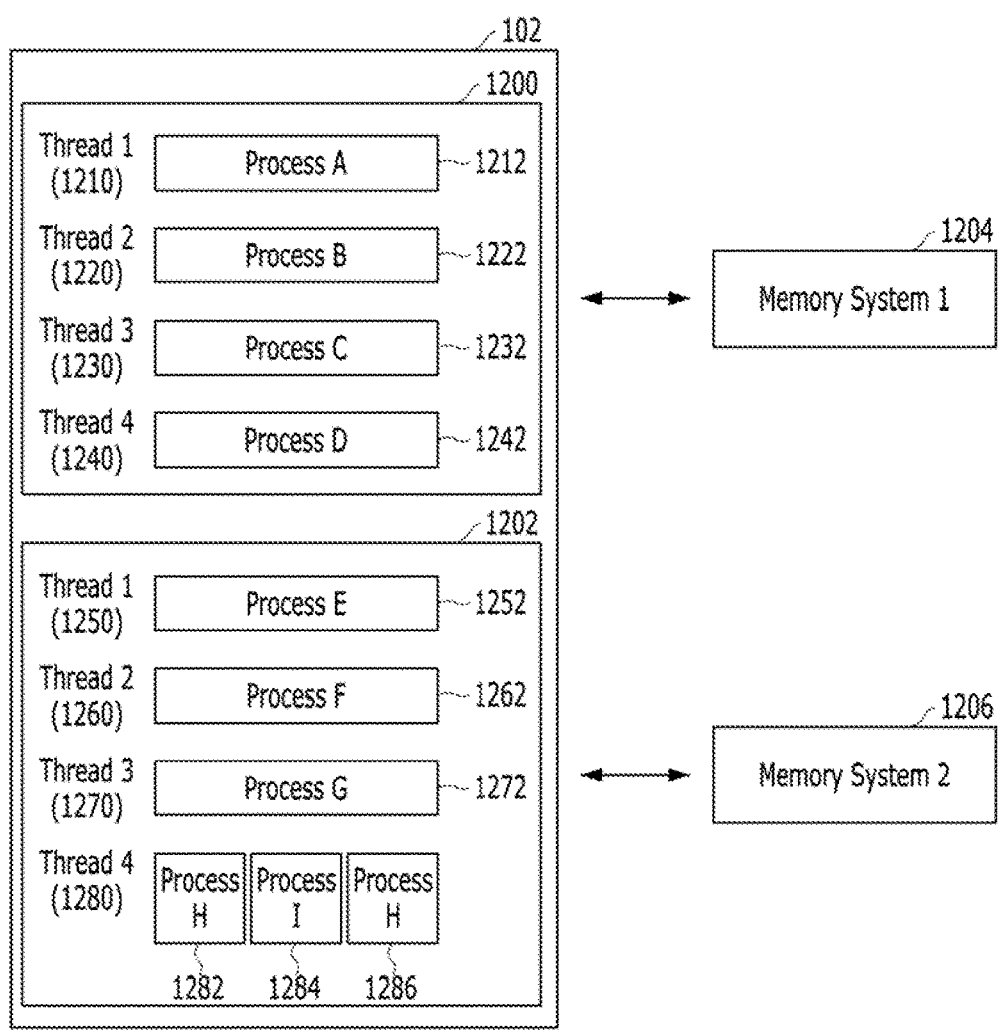
FIGS. 12 and 13 are diagrams schematically describing a data processing operation between a host and a plurality of memory systems in a data processing system, according to an embodiment of the present invention.
Figure 13:
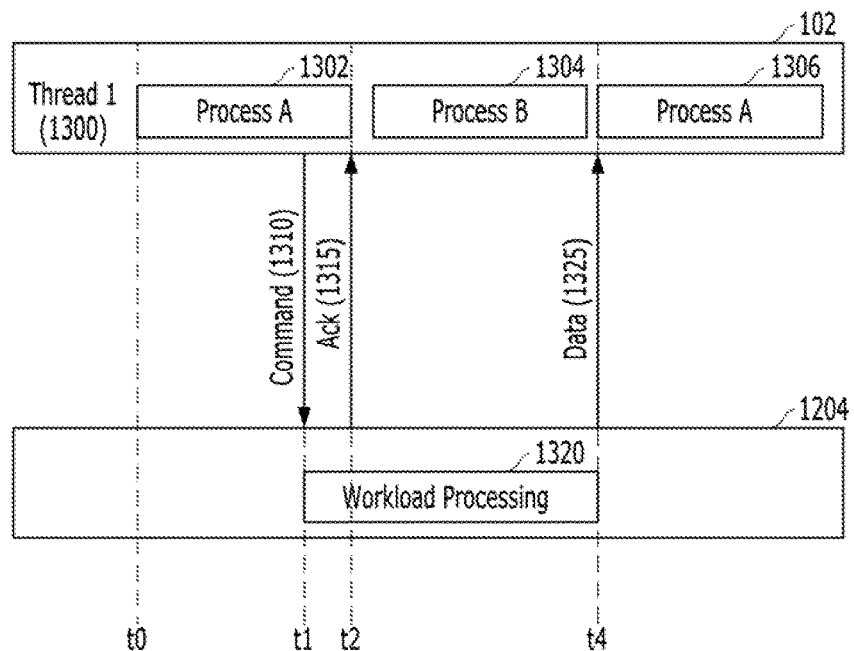

FIGS. 12 and 13 are diagrams schematically describing an example of the data processing operation between the host and the plurality of memory systems in the data processing system according to an embodiment of the present invention. An example, a case in which the host 102 in the data processing system 100 including the plurality of memory systems 110 illustrated in FIG. 1 performs a data processing operation will be described. The host 102 may transmit commands corresponding to threads for the plurality of memory systems to the memory systems for processing the threads. The memory systems may perform command operations in response to the commands received from the host 102. According to the command operations of the memory systems, the host 102 may process the threads by performing processes corresponding to the threads.

Furthermore, in the data processing system 100 including the plurality of memory systems, the host 102 may perform processes for processing threads or particularly transmit commands corresponding to the threads to first and second memory systems so that the first and second memory systems perform command operations to process the threads. The first and second memory systems may perform the command operations corresponding to the commands received from the host 102, and the host 102 may prepare processes for the threads in advance by considering the times at which the command operations in the first and second memory systems are ended, and perform the processes at the end times of the command operations.

In the present embodiment, the host 102 may perform processes for threads, and transmit commands to the first and second memory systems. When receiving the commands from the host 102, the first and second memory systems may estimate the end times of command operations which are to be performed in response to the commands received from the host 102, include time information corresponding to the end times in acknowledgement signals of the commands, and transmit the acknowledgement signals to the host 102. An acknowledgement signal is a signal indicating that data has been received successfully, i.e., with an acceptable number of errors.

Then, the host 102 may check the end times of the command operations in the first and second memory systems through the time information included in the acknowledgement signals received from the first and second memory systems, prepare processes for threads in advance, the threads corresponding to the command operations in the first and second memory systems, and perform the processes at the end times of the command operations. The processes for threads may indicate processes corresponding to the commands transmitted to the first and second memory systems.

In the present embodiment, the first and second memory systems which perform command operations in response to commands received from the host 102 of FIG. 1 may be implemented as the memory device 150 and the controller 130, respectively, which are illustrated in FIG. 1. The first and second memory systems may be implemented with different types of memory devices. For example, the first memory system may include a Solid State Drive (SSD) as a first type of memory device, and include a Hard Disk Drive (HDD) as a second type of memory device.

The first memory system in the data processing system according to the present embodiment may include the memory device 150 and the controller 130 which are implemented with a first type of memory device such as SSD and a controller corresponding to the first type of memory device, respectively, and the second memory system may include the memory device 150 and the controller 130 which are implemented with a second type of memory device such as HDD and a controller corresponding to the second type of memory device, respectively. The first and second memory systems may include the same type of memory devices, for example, the first type of memory devices or the second type of memory devices.

In the present embodiment, a data processing operation between the host 102 and the first memory system including the first type of memory device will be taken as an example for description.

However, the data processing system according to the present embodiment can also be applied to a data processing operation between the host 102 and memory systems including the same type of memory devices or memory systems including different types of memory devices.

In the data processing system according to the present embodiment, the host 102 may perform processes for processing threads with one of the plurality of memory systems, for example, the first memory system. A processor of the host 102 may be implemented in a system included in the host 102, for example, a file system or operating system serving as a host system. In other words, a microprocessor or CPU serving as the processor of the host 102 may be implemented in the system of the host 102 or the host system, according to the same manner as the microprocessor or CPU serving as the processor 134 of the memory system 110 in FIG. 1 is implemented in the memory system 110.

In the present embodiment, the host 102 may perform a plurality of processes corresponding to a plurality of threads through a plurality of processors included in the host 102, for example, a plurality of CPUs, respectively, for processing the plurality of threads. At this time, for processing the threads with the plurality of memory systems, the host 102 may transmit commands corresponding to the threads to the memory systems, receive acknowledgement signals from the memory systems which perform command operations corresponding to the respective commands, check the end times of the command operations through the acknowledgement signals, prepare processes corresponding to the command operations in advance, and perform the processes corresponding to the command operations or processes of the CPUs at the end times of the command operations. Hereafter, referring to FIGS. 12 to 13, the data processing operation in the data processing system according to the present embodiment will be described in more detail. During the data processing operation, the host 102 may perform a plurality of processes corresponding to a plurality of threads, for example, arbitrary first threads for processing the threads, and thus process data with the plurality of memory systems, for example, the first and second memory systems.

Referring to FIG. 12, the data processing system may include the host 102 and the first and second memory systems each of which includes the memory device 150 and the controller 130 of FIG. 1 and receives a command from the host 102. The first and second memory systems may include a memory system 1(1204) and a memory system 2(1206), for example. The host 102 may include a plurality of processors, for example, a CPU 1(1200) and a CPU 2(1202). For processing a plurality of threads with the memory systems 1204 and 1206 through the CPU 1(1200) and the CPU 2(1202), the host 102 may perform a plurality of processes corresponding to the respective threads, and process the threads with the memory systems 1204 and 1206.

More specifically, the host 102 may process a plurality of threads by performing processes corresponding to the plurality of threads, for example, a thread 1(1210), a thread 2(1220), a thread 3(1230) and a thread 4(1240), respectively, through the CPU 1(1200).

For example, the host 102 may process the thread 1(1210) by performing a process A(1212) corresponding to the thread 1(1210) through the CPU 1(1200), process the thread 2(1220) by performing a process B(1222) corresponding to the thread 2(1220) through the CPU 1(1200), process the thread 3(1230) by performing a process C(1232) corresponding to the thread 3(1230) through the CPU 1(1200), and process the thread 4(1240) by performing a process D(1242) corresponding to the thread 4(1240) through the CPU 1(1200).

Furthermore, the host 102 may process a plurality of threads by performing processes corresponding to the plurality of threads, for example, a thread 1(1250), a thread 2(1260), a thread 3(1270) and a thread 4(1280), respectively, through the CPU 1202. For example, the host 102 may process the thread 1(1250) by performing a process E(1252) corresponding to the thread 1(1250) through the CPU 2(1202), process the thread 2(1260) by performing a process F(1262) corresponding to the thread 2(1260) through the CPU 2(1202), process the thread 3(1270) by performing a process G(1272) corresponding to the thread 3(1270) through the CPU 2(1202), and process the thread 4(1280) by performing processes H(1282, 1286) and a process 1(1284) corresponding to the thread 4(1280) through the CPU 2(1202). At this time, for processing the thread 4(1280), the host 102 may sequentially perform the processes H(1282, 1286) and the process 1(1284) corresponding to the thread 4(1280) through the CPU 2(1202). For example, the host 102 may perform the process H(1282), the process 1(1284) and the process H(1286) through the CPU 2(1202).

The host 102 may transmit commands corresponding to the threads 1210 to 1240 to the memory systems 1204 and 1206, for processing the plurality of threads 1210 to 1240 with the memory systems 1204 and 1206 by performing the processes 1212 to 1242 in the CPU 1(1200). Furthermore, the host 102 may transmit commands corresponding to the threads 1250 to 1280 to the memory systems 1204 and 1206, for processing the plurality of threads 1250 to 1280 with the memory systems 1204 and 1206 by performing the processes 1252, 1262, 1272, 1282, 1284 and 1286 in the CPU 2(1202).

Then, when receiving the commands from the host 102, the memory systems 1204 and 1206 may perform command operations corresponding to the commands. At this time, the memory systems 1204 and 1206 may estimate end times of the command operations, and then transmit acknowledgement signals including time information corresponding to the end times to the host 102. In other words, when receiving the commands from the host 102, the memory systems 1204 and 1206 may transmits the acknowledgement signals of the commands received from the host 102 to the host 102, and the acknowledgement signals may include the time information corresponding to the end times of the command operations corresponding to the commands in the memory systems 1204 and 1206.

The time information corresponding to the end times of the command operations in the memory systems 1204 and 1206 may be included in reserved or auxiliary regions of the acknowledgement signals of the commands received from the host 102, and then transmitted to the host 102. The reserved or auxiliary region may indicate a reserved or auxiliary region of a response signal to a received command or a reserved or auxiliary region of a response command, for example, a data set management command.

For example, when a read/write workload is generated according to a data read/write request of a user, the host 102 may perform processes corresponding to the read/write workload through the CPUs 1200 and 1202, for processing threads corresponding to the read/write workload. At this time, the host 102 may process the threads corresponding to the read/write workload with the memory systems 1204 and 1206. In other words, in order to read/write data from/to the memory devices of the memory systems 1204 and 1206, the host 102 may transmit read/write commands corresponding to the read/write workload to the memory systems 1204 and 1206. Then, the memory systems 1204 and 1206 may estimate end times of command operations corresponding to the read/write commands or read/write operations which are performed to process the read/write workload, and then transmit acknowledgement signals of the read/write commands to the host 102. As described above, the acknowledgement signal may include time information corresponding to the end time of the read/write operation.

In particular, when the host 102 prepares the processes of the CPUs 1200 and 1202 in advance according to the end times of the read/write operations, the reserved/auxiliary regions of the data set management commands in the read/write commands, which the host 120 transmits to the memory systems 1204 and 1206 in order to the process the read/write workload, may include the advance preparation information indicating that the host 102 uses the advance preparation for the processes, and the memory systems 1204 and 1206 receiving the commands including the advance preparation information may estimate the end times of the read/write operations, include time information corresponding to the end times in the reserved/auxiliary regions of the data set management commands, and transmit the data set management commands to the host 102.

At this time, the memory systems 1204 and 1206 may perform command operations corresponding to commands, even after transmitting the acknowledgement signals including the time information to the host 102.

The host 102 may receive the acknowledgement signals of the commands from the memory systems 1204 and 1206, and check the time information included in the acknowledgement signals, e.g., the end times of the command operations in the memory systems 1204 and 1206. Furthermore, the host 102 may prepare processes of threads corresponding to the command operations in the memory systems 1204 and 1206 or the processes 1212, 1222, 1232, 1242, 1252, 1262, 1272, 1282, 1284 and 1286 in the CPUs 1200 and 1202, which correspond to the command operations. Then, the host 102 may perform the prepared processes at the end times of the command operations in the memory systems 1204 and 1206. Hereafter, referring to FIG. 13, a data processing operation in case where the host 102 and an arbitrary memory system among the plurality of memory systems, for example, the memory system 1(1204) in the data processing system according to the present embodiment process an arbitrary thread among a plurality of threads will be described in detail.

Referring to FIG. 13, when a read/write workload is generated according to a data read/write request of a user, the host 120 in the data processing system may perform processes corresponding to a thread corresponding to the read/write workload, for example, a thread 1(1300) through the CPU of the host 102, for processing the thread 1(1300). The processes may include processes A(1302, 1306) and a process B(1304).

More specifically, when a read workload is generated according to a read request of the user, the host 102 may perform the process A (1302) corresponding to the thread 1(1300) at a time t0, for processing the thread 1(1300) corresponding to the read workload.

Then, the host 102 may transmit a command corresponding to the thread 1(1300), e.g., a read command to the memory system 1(1204) at a time t1 (1310), for processing the thread 1(1300) corresponding to the read workload with the memory system 1(1204) or in order for the memory system 1(1204) to process the read workload.

At the time t1, the memory systems 1(1204) may receive the command from the host 102, and process the read workload by performing a command operation corresponding to the command or a read operation corresponding to the read command (workload). At this time, the memory system 1(1204) may estimate the end time of the command operation corresponding to the command received from the host 102 at the time t1, include time information corresponding to the end time in an acknowledgement signal of the command received from the host 102 at the time t1, and then transmit the acknowledgement signal to the host 102 at a time t2 (1315). That is, when receiving the command from the host 102 at the time t1, the memory system 1(1204) may estimate the end time of the corresponding command operation, and then transmit the acknowledgement signal 1315 to the host 102 at the time t2, the acknowledgement signal 1315 having a reserved/auxiliary region which includes the time information corresponding to the end time. Furthermore, the memory system 1(1204) may process the workload by performing the command operation corresponding to the command from the time t1 (workload).

Upon receiving the acknowledgement signal 1315 including the time information corresponding to the end time from the memory system 1(1204) at the time t2, the host 102 may end the process A(1302) which started at the time t0, according to the thread 1(1300) of the read workload based on the read request of the user, and then perform a process B(1304) in response to the acknowledgement signal 1315 received from the memory systems 1204, at the time t2. That is, the host 102 may start performing the process A(1302) corresponding to the thread 1(1300) at the time t0, check the end time of the command operation in the memory system 1(1204) through the acknowledgement signal 1315 received from the memory system 1(1204) at the time t2 while the process A(1302) is being performed, and then change the process mode from the process A(1302) to the process B(1304) in response to the acknowledgement signal 1315 received from the memory system 1(1204) at the time t2.

Then, the host 102 may also perform the process B(1304) in response to the acknowledgement signal 1315 received from the memory system 1(1204), at the time t2. At this time, the host 102 may perform the process B(1304) until the end time corresponding to the time information included in the reserved/auxiliary region of the acknowledgement signal 1315, and prepare the process A(1306) in advance to perform the process A(1306) corresponding to the command operation of the memory system 1(1204) at the end time of the command operation in the memory system 1(1204). That is, the host 102 may check the end time of the command operation in the memory system 1(1204) through the time information included in the acknowledgement signal 1315, thereby checking that the command operation in the memory system 1(1204) will be ended at a time t4. Thus, at the time t4, the host 102 may check that data Data 1325 corresponding to the command operation in the memory system 1(1204), for example, read data corresponding to the read operation will be transmitted to the host 102.

The host 102 may prepare the process A(1306) in advance at a time before the time t4, such that the process corresponding to the read data or the process A(1306) corresponding to the read operation which is the command operation in the memory system 1(1204) is performed at the time t4 that the read data are transmitted from the memory system 1(1204). Therefore, before the time t4, the host 102 may end the process B(1304) which started at the time t2 after the acknowledgement signal 1315 was received, and prepare the process A(1306) which will be performed from the time t4.

The memory system 1(1204) may process the workload by performing the command operation from the time t1 that the command was received from the host 102 (1320), and transmit workload data corresponding to the processed workload, for example, read data Data 1325 corresponding to the read workload to the host 102 at the time t4.

The host 102 may prepare the process corresponding to the command operation in the memory system 1(1320), e.g., the process A(1306) for processing the workload data corresponding to the workload through the acknowledgement signal received from the memory system 1(1320). When receiving the workload data, e.g., the read data Data 1325 from the memory system 1(1204) at the time t4, the host 102 may perform the process A(1306) to process the read data Data 1325 received from the memory system 1(1204) or the thread 1(1300). That is, before the time t4, the host 102 may end the process B(1304) and then prepare the process A(1306) in advance, thereby changing the process mode from the process B(1304) to the process A(1306). Thus, at the time t4 when the workload data Data 1325 are received from the memory system 1(1204), the host 102 may immediately perform the process A(1306) to process the workload data or the thread 1(1300).

At this time, when the command operation in the memory system 1(1204) or the workload processing operation 1320 is ended before the time t4 corresponding to the end time checked through the acknowledgement signal, the host 102 may receive workload data from the memory system 1(1204) at a time before the time t4, prepare the process A(1306) corresponding to the workload data at the time that the workload data are received from the memory system 1(1204), and perform the process A(1306), thereby processing the workload data or the thread 1(1300). In other words, when the workload processing operation 1320 in the memory system 1(1204) is ended before the end time checked through the acknowledgement signal, the host 102 may receive the workload data from the memory system 1(1204) at the time before the end time. In this case, the host 102 may change the process mode from the process B(1304) to the process A(1306) at the time that the workload data are received from the memory system 1(1204), and then perform the process A(1306).

When the command operation in the memory system 1(1204) or the workload processing operation 1320 is ended after the time t4 corresponding to the end time checked through the acknowledgement signal, the host 102 may receive workload data from the memory system 1(1204) at a time after the time t4, and retain the process A(1306) in the CPU of the host 102 during a retention time, the process A(1306) being prepared in advance in response to the workload data.

The retention time may be set according to operation latency in case where the memory system 1(1204) performs a command operation, that is, operation latency in the memory system 1(1204) which performs a command operation and transmission latency in case where workload data are transmitted to the host 102 from the memory system 1(1204), that is, transmission latency of workload data between the memory system 1(1204) and the host 102.

Thus, when receiving workload data from the memory system 1(1204) within the retention time, the host 102 may process the workload data or the thread 1(1300) by immediately performing the process A(1306) at the time that the workload data are received from the memory system 1(1204). On the other hand, when not receiving the workload data from the memory system 1(1204) within the retention time, the host 102 may end the prepared process A(1306) and perform another process, for example, an arbitrary process corresponding to the thread 1(1300) or the process B(1304) which was performed before the advance preparation of the process A(1306), during the retention time. At this time, when receiving workload data from the memory system 1(1204), the host 102 may change the process mode from the process B(1304) to the process A(1306) at the time that the workload data are received from the memory system 1(1204), and then perform the process A(1306).

In the data processing system according to the present embodiment, the host may perform a process corresponding to a workload which is processed in a memory system, transmit a command corresponding to the workload to the memory system, and receive an acknowledgement signal of the command from the memory system. Then, the host may check the end time of the command operation corresponding to the command in the memory system through the acknowledgement signal of the command, and change the process mode from the process corresponding to the workload to another process, according to the end time. Furthermore, the host may prepare the process corresponding to the command operation in the memory system or the process corresponding to the workload, and perform the prepared process when receiving workload data corresponding to the workload from the memory system at the end time. Therefore, in the data processing system according to the present embodiment, the host may prepare the process corresponding to the command operation of the memory system in advance, and immediately perform the process at the end time of the command operation, thereby minimizing an idle period between the processes. Thus, the data processing performance of the data processing system can be improved. Now, referring to FIG. 14, a data processing operation between the host and a memory system in the data processing system according to the present embodiment will be described in detail.

Figure 14:
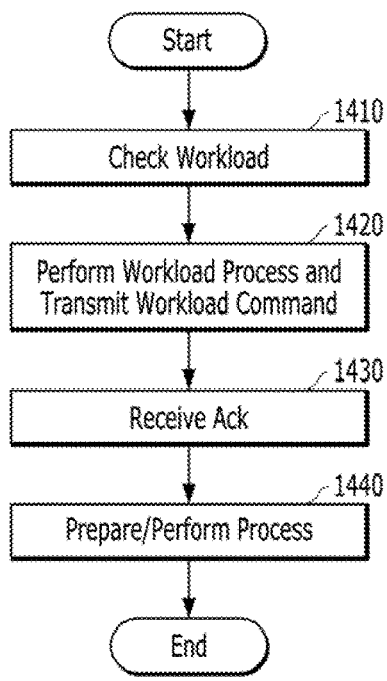
FIG. 14 is a diagram schematically illustrating a data processing operation, according to an embodiment of the present invention.

FIG. 14 is a diagram schematically illustrating a data processing operation according to an embodiment of the present invention Referring to FIG. 14, at step 1410, the host in the data process system may check a workload which is processed in a memory system. At step 1420, the host may perform a process corresponding to the workload (a workload process), and transmit a command corresponding to the workload (workload command) to the memory system.

At step 1430, the host may receive an acknowledgement signal from the memory system for the received command. The acknowledgement signal may include time information indicating an end time of the command operation corresponding to the command in the memory system.

At step 1440, the host may check the end time of the command operation in the memory system through the time information include in the acknowledgement signal, prepare a process corresponding to the command operation in the memory system so that the process corresponding to the command operation in the memory system is performed at the end time. Then, when receiving data corresponding to the command operation from the memory system or workload data corresponding to the workload at the end time, the host may immediately perform the prepared process, and thus process the work data.

The configuration in which the host performs the process corresponding to the workload processed in the memory system, transmits the command, checks the end time of the command operation in the memory system through the acknowledgement signal of the command, prepares the process corresponding to the command operation in advance, performs the prepared process when receiving the workload data from the memory system at the end time, and processes the workload data has been described in more detail with reference to FIGS. 12 and 13. Thus, the detailed descriptions thereof are omitted herein.

According to the present embodiment, the data processing system and the operating method thereof can minimize the complexity and performance reduction of the host and the memory systems, rapidly and stably process data between the host and the memory systems, and maximize the use efficiency of the host and the memory systems.

Although various embodiments have been described for illustrative purposes, it will be apparent to those skilled in the art that various changes and modifications may be made without departing from the spirit and scope of the invention as defined in the following claims.

What is claimed is:

1. A data processing system comprising:
a plurality of memory systems each comprising a memory device and a controller for the memory device; and
a host system suitable for performing processes corresponding to workloads which are processed in the plurality of memory systems,
wherein at a first time, the host system performs a first process corresponding to a first workload among the workloads and transmits a command corresponding to the first workload to the memory systems, and
at a second time, the host system receives an acknowledgement signal including an end time of a command operation corresponding to the command from the memory systems, recognizes the end time of the command operation performed in the memory system, finalizes the first process corresponding to the first workload, and prepares beginning the first process corresponding to the first workload at or after the end time.

2. The data processing system of claim 1, wherein the host system ends the first process which started at the first time in response to the first workload, according to the end time, and performs a second process corresponding to a second workload among the workloads, at the second time.

3. The data processing system of claim 2, wherein the host system receives data corresponding to the first workload from the memory systems which ended the command operation, at a third time, according to the end time.

4. The data processing system of claim 3, wherein the host system ends the second process which started at the second time and prepares the first process in advance, at a fourth time before the third time, according to the end time.

5. The data processing system of claim 4, wherein the host system processes the data corresponding to the first workload received from the memory systems by performing the first process prepared from the fourth time at the third time.

6. The data processing system of claim 5, wherein the host system retains the prepared first process during a retention time from the third time, and performs the prepared first process to process the data received from the memory systems during the retention time from the third time.

7. The data processing system of claim 6, wherein the retention time is determined according to operation latency in the memory systems performing the command operation or transmission latency of the data corresponding to the first workload.

8. The data processing system of claim 1, wherein the memory systems estimate the end time of the command operation which is performed in the memory systems in response to the command, and then transmit the acknowledgement signal including time information corresponding to the end time to the host system.

9. The data processing system of claim 1, wherein the memory systems estimate the end time in the memory systems which end processing the first workload, and transmit the acknowledgement signal including timing information corresponding to the end time to the host system.

10. The data processing system of claim 1, wherein the time information corresponding to the end time is included in a reserved region or an auxiliary region of the acknowledgement signal.

11. An operating method of a data processing system, comprising:
transmitting a command corresponding to a first workload to a plurality of memory systems by performing a first process corresponding to the first workload among workloads which are performed by the plurality of memory systems each including a memory device and a controller for the memory device;
receiving an acknowledgement signal including an end time of a command operation corresponding to the command from the memory systems in response to the transmission of the command; and
recognizing the end time of the command operation performed in the memory system, finalizing the first process corresponding to the first workload, and then preparing beginning the first process corresponding to the first workload at or after the end time.

12. The operating method of claim 11, further comprising ending the first process which started at a first time in response to the first workload, according to the end time, and performing a second process corresponding to a second workload among the workloads at a second time.

13. The operating method of claim 12, further comprising receiving data corresponding to the first workload from the memory systems which ended the command operation, at a third time, according to the end time.

14. The operating method of claim 13, wherein the preparing of the first process comprises ending the second process which started at the second time, at a fourth time before the third time, according to the end time, and then preparing the first process in advance.

15. The operating method of claim 14, further comprising processing the data corresponding to the first workload and received from the memory systems by performing the first process prepared from the fourth time at the third time.

16. The operating method of claim 15, wherein the processing of the data comprises:
retaining the prepared first process during a retention time from the third time; and
performing the prepared first process to process the data received from the memory system during the retention time from the third time.

17. The operating method of claim 16, wherein the retention time is determined according to operation latency in the memory systems performing the command operation or transmission latency of the data corresponding to the first workload.

18. The operating method of claim 11, further comprising:
estimating the end time of the command operation which is performed in the memory systems in response to the command; and
transmitting the acknowledgement signal including time information corresponding to the end time.

19. The operating method of claim 11, further comprising:
estimating the end time in the memory systems which ends processing the first workload; and
transmitting the acknowledgement signal including time information corresponding to the end time.

20. The operating method of claim 11, wherein the time information corresponding to the end time is included in a reserved region or an auxiliary region of the acknowledgement signal.

* * * * *